US006363243B1

(12) United States Patent
Persson et al.

(10) Patent No.: US 6,363,243 B1
(45) Date of Patent: Mar. 26, 2002

(54) ARRANGEMENT RELATING TO MECHANICALLY INTERLOCKING DEVICES

(75) Inventors: Per-Håkan Persson, Kävlinge; Stig Frohlund, Hässleholm; Martin Pilcher, Lund, all of (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/287,971

(22) Filed: Apr. 7, 1999

(30) Foreign Application Priority Data

Apr. 7, 1998 (SE) ............................................. 9801221

(51) Int. Cl.[7] ................................................ H04B 1/38
(52) U.S. Cl. .......................... 455/90; 455/575; 455/550
(58) Field of Search .......................... 455/550, 90, 575, 455/73; 379/433, 445, 434; D14/249, 138, 135, 137; 292/146, 147, 300, 87; 70/158, 58

(56) References Cited

U.S. PATENT DOCUMENTS

| | | | | |
|---|---|---|---|---|
| 4,656,697 A | | 4/1987 | Näslund | 24/30.5 |
| 5,274,882 A | * | 1/1994 | Persson | 16/303 |
| 5,327,584 A | * | 7/1994 | Adachi et al. | 455/575 |
| 5,689,824 A | * | 11/1997 | Nagai | 455/575 |
| 5,706,332 A | * | 1/1998 | Nagai | 455/550 |
| 5,881,150 A | * | 3/1999 | Persson | 379/433.13 |
| 5,956,398 A | * | 9/1999 | Weadon et al. | 379/433.05 |
| 6,151,486 A | * | 11/2000 | Holshouser et al. | 455/90 |
| 6,256,194 B1 | * | 7/2001 | Choi et al. | 292/4 |

FOREIGN PATENT DOCUMENTS

| | | |
|---|---|---|
| EP | 0751043 A1 | 1/1997 |
| GB | 2106977 A | 4/1983 |
| WO | WO 83/00272 | 1/1983 |

* cited by examiner

*Primary Examiner*—Dwayne Bost
*Assistant Examiner*—Sonny Trinh
(74) *Attorney, Agent, or Firm*—Jenkens & Gilchrist, P.C.

(57) ABSTRACT

It is shown a locking arrangement at a portable device such as a telephone terminal. The device comprises a main body and a movable protruding member such as a flip-lid. The protruding member is switchable between at least a first position and a second position with respect to the main body. The locking arrangement comprises a plunger unit and a lock and release unit with a fixed part and a resilient part. The resilient part is resilient along at least one direction of resilience (X) away from the fixed part. The plunger unit is switchable, along a direction of insertion and retraction, between a disengaged position and an engaged position between the fixed part and the resilient part.

29 Claims, 5 Drawing Sheets

B – B

C – C

B–B

C–C

ARRANGEMENT RELATING TO MECHANICALLY INTERLOCKING DEVICES

TECHNICAL FIELD OF THE INVENTION

The present invention relates to mechanical locking arrangements for enabling mechanical interlocking between two devices, in particular to locking arrangements that comprise a plunger unit and a lock and release unit.

DESCRIPTION OF RELATED ART

The technical evolution, in terms of features such as weight and size, in the field of portable mobile telephone terminals has reached a point where physiognomic considerations must be made. Limitations in terms of size of previous generations of mobile terminals were dictated by the size of the components of the terminal, not least the size of the battery pack. Present day terminals, on the other hand, comprise a small number of highly integrated low-power circuits that easily fit inside a palm-sized unit. In fact the dimensions of the smaller among the recently developed terminals are such that the distance between the loudspeaker and the microphone has become an important design factor. In order to further miniaturize the terminals, while still enabling a proper alignment between the loudspeaker/microphone and the ear/mouth of the user, mechanical solutions such as foldable lids and arms comprising a microphone or a speaker have become commonplace.

A problem relating to foldable and flip-lid equipped portable terminals, and in fact to any portable device that comprises protruding members that are attached by e.g. a hinge unit and are capable of being folded between different positions in relation to a main housing of the device, is how to enable single action lock and single action release of the protruding member.

An example of the state of the art in this respect is disclosed in U.S. Pat. No. 5,327,584 where it is shown a portable radio with a cover release mechanism. Several separate parts act together to form the cover release mechanism: an engaging portion with a hole, a locking plate operated upon by an operating portion, a wire spring mounted on a stopper. Needless to say, by the mere fact that it comprises a multitude of sub-parts, this mechanism is relatively complicated in terms of both assembly and manufacture.

Another example of locking arrangements is to be found in UK patent application GB-2106977. A vanity case comprising a receptacle and a cover member has an arrangement for enabling snap engagement between the receptacle and the cover member. The snap engagement and disengagement are accomplished by applying force between two resilient latch tongues, one comprised in the cover member and one being part of the receptacle. The force is applied via a separate slider element.

SUMMARY OF THE INVENTION

It is hence a problem, which is addressed by the present invention, how to enable one-hand single action lock and one-hand single action release of a protruding member such as e.g. a flip-lid at a portable communication device.

Yet another problem addressed by the present invention is how to enable single action lock and release of the protruding member, while utilizing a minimum of number of components.

The object of the present invention is to overcome the problems as stated above. This is in short achieved by providing a locking arrangement in which a plunger unit is capable of being engaged in and disengaged from a lock and release unit which comprises a resilient part and a fixed part.

In some more detail, it is shown a locking arrangement at a portable device. The device comprises a main body and a movable protruding member. The protruding member is switchable between at least a first position and a second position with respect to the main body. The locking arrangement comprises a plunger unit and a lock and release unit with a fixed part and a resilient part. The resilient part is resilient along at least one direction of resilience away from the fixed part. The plunger unit is switchable, along a direction of insertion and retraction, between a disengaged position and an engaged position between the fixed part and the resilient part of the lock and release unit.

An advantage of the present invention is that only a small motion, e.g. a hand action, is required by a user of the invention in order to engage and disengage the plunger unit to and from the lock and release unit and thus releasing the protruding member from the main body of the device.

Another advantage of the present invention is that, by the fact that the lock and release unit can be produced in one single unit, the complexity, and hence also the cost, relating to manufacture and assembly onto the device is low.

DETAILED DESCRIPTION OF PREFERRED EMBODIMENTS

Figure 1A:
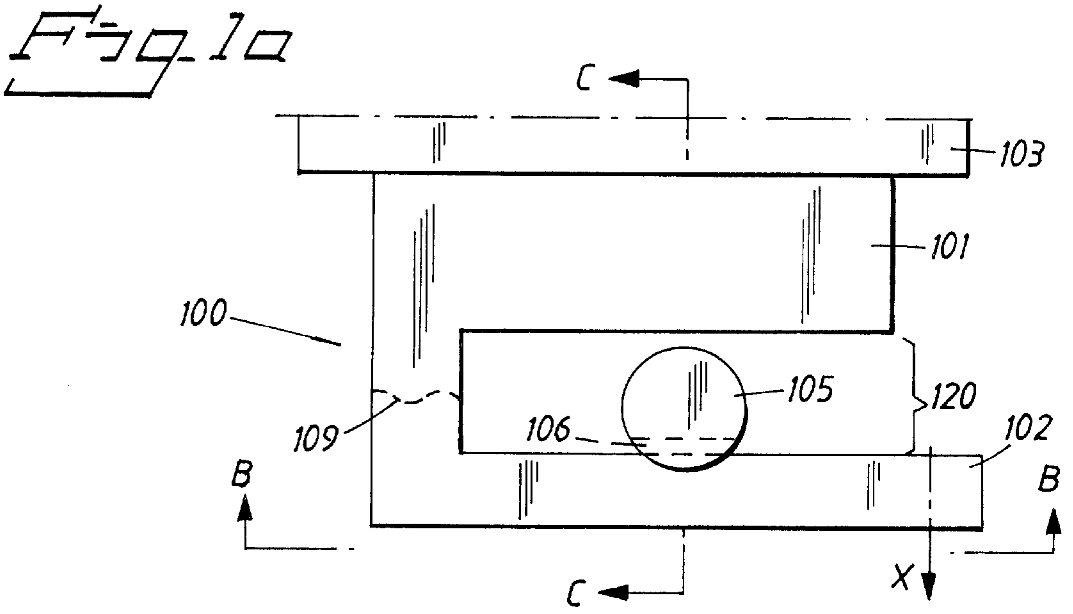
FIGS. 1*a–c* illustrate two schematic side views and a cross-sectional view of a first embodiment of a locking arrangement.

A first preferred embodiment of a locking arrangement according to the invention, showing the general function of locking a member 104 to a main body 103, is illustrated in FIGS. 1*a,* 1*b* and 1*c*. The arrangement comprises a lock and release unit 100 and a plunger 105.

A first side view is shown in FIG. 1*a* where the lock and release unit 100 is attached to the main body 103. The particular properties of the main body 103 are outside the scope of the invention, although a typical main body 103 may be a portable device such as a telephone as will be further exemplified below. Furthermore, the attachment of the lock and release device 100 to the main body 103 is also outside the scope of the invention and is hence not explained in further detail in connection with FIGS. 1*a–c.*

The lock and release device 100 comprises an elongated fixed part 101, which is attached to the main body 103, and an elongated resilient part 102. The resilient part 102 is resilient along a direction X away from the fixed part 101 creating a gap 120 having varying extent between the fixed and resilient parts 101,102.

A delimiting line 109 has been indicated in the figure in order to illustrate roughly where the resilient part 102 and the fixed part 101 of the lock and release unit 100 transit into each other. The delimiting line 109 is not an illustration of where the two parts 101,102 attach to each other, thus implicating a necessity of two separate parts. Rather, the delimiting line 109 is simply an indication of the fact that the lock and release unit 100 may be in the form of one single unit as well as being formed of two separate parts joined together.

The actual resilience of the resilient part 102 is obtained according to characteristics such as physical properties of the material of the part. It is known in the art how to obtain suitable resilient properties and it will hence not be discussed in detail. However, it is obvious that a plastic material manufactured by e.g. a process of injection molding is a reasonable choice. Nevertheless, other materials such as metals or even wood may be suitable depending on the application.

Figure 1B:
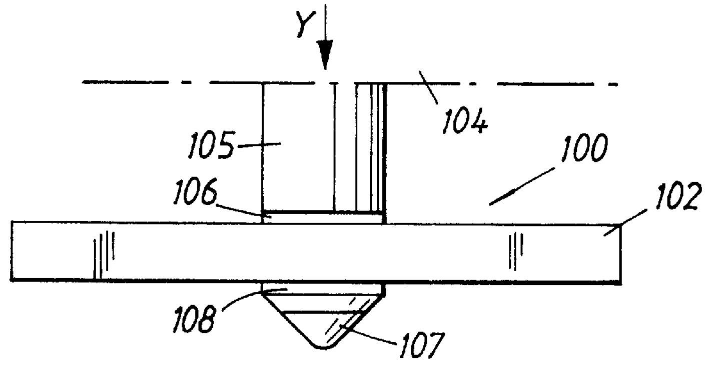
Figure 1C:
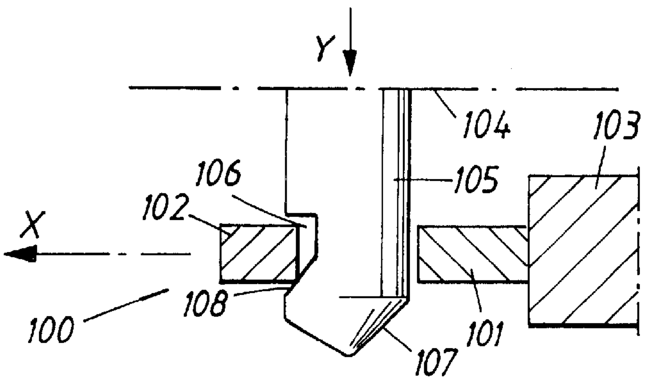

With reference to FIGS. 1*b* and 1*c*, an elongated plunger unit 105 having a notch 106 and a tapered end 107 is attached to the member 104. The member 104 is to be locked to the main body 103 by means of the locking arrangement comprising the plunger unit 105 and the lock and release unit 100. Examples of members 104 having specific characteristics will be discussed below in connection with other embodiments of the invention.

The plunger unit 105 is in FIGS. 1*a–c* located within the gap 120 between the resilient part 102 and the fixed part 101 locking the member 104 to the main body 103. The locking is effectuated by moving the plunger 105 with it's tapered end 107 along a direction Y, forcing the resilient part 102 along direction X widening the gap 120 until the notch 106 catches the resilient part 102 which retracts backwards against the direction X. The notch 106 comprises a slanted edge 108 along which the resilient part 102 slides when retracting. The direction X is mainly perpendicular to the direction Y. This is also the case in the other following embodiments of the invention.

By forcing the member 104 with the attached plunger 105 backwards along the direction Y the member 104 may be unlocked from the main body 103. Such a backwards motion will entail the resilient part 102 sliding against the slanted edge 108 of the notch 106 and hence bring about a motion of the resilient part 102 towards the direction X, widening the gap 120. Further backward motion of the member 104 and plunger 105 will result in an unlocking of the plunger from the lock and release unit 100.

Figure 2A:
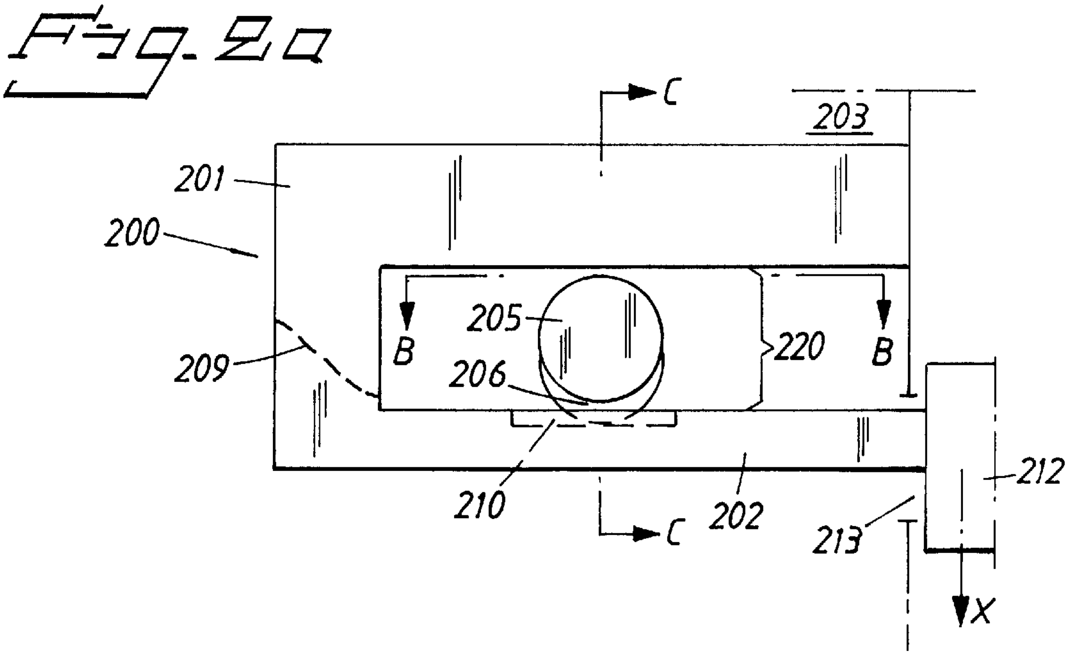
FIGS. 2*a–c* illustrate one schematic side view and two cross-sectional views of a second embodiment of a locking arrangement.
Figure 2B:
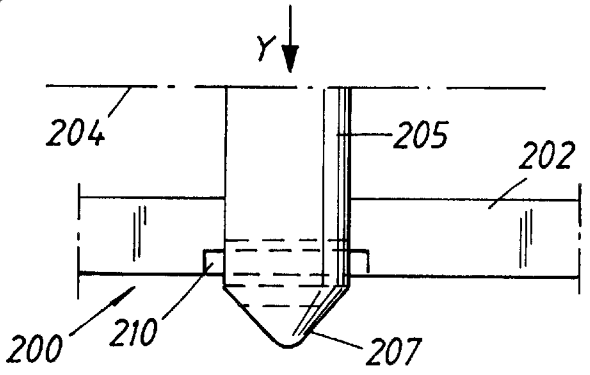
Figure 2C:
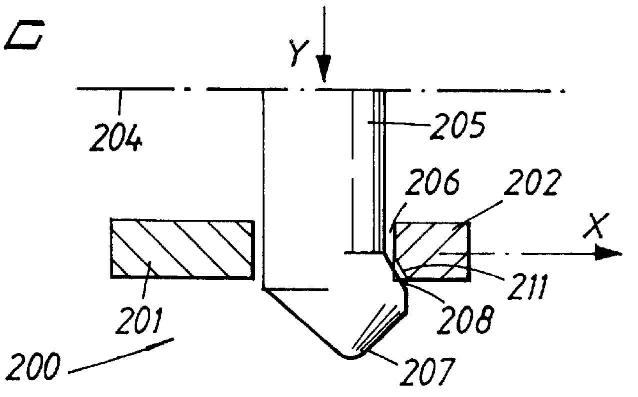

A second embodiment according to the invention is disclosed in FIGS. 2*a–c*. As in the previous example, a lock and release unit 200 comprising a fixed part 201 and a resilient part 202 is attached to a main body 203 of e.g. a portable device. In a typical example of an implementation, the main body 203 may be a mobile telephone terminal. In such a case the main body 203 would correspond to a housing of such a telephone terminal.

Both the fixed part 201 and the resilient part 202 are elongated and are forming a single unit. A dashed line 209 indicates roughly where a transition between the two parts 202,202 is located. The resilient part 202 is resilient along a direction X away from the fixed part 201 creating a gap 220 having varying extent. Attached to, or rather forming an integrated part of, the resilient part 202 is an actuating part 212. The actuating part 212 extends through a hole 213 in the main body 203 making it accessible from without.

Also, as in the previous example, an elongated plunger unit 205 having a notch 206 and a tapered end 207 is attached to a member 204. The member 204 is to be locked to the main body 203 by means of the locking arrangement comprising the plunger unit 205 and the lock and release unit 200. A typical example of a member 204 may be a flip-lid at a mobile telephone terminal.

The plunger unit 205 is located within the gap 220 between the resilient part 202 and the fixed part 201 locking the member 204 to the main body 203.

As in the example shown in connection with FIGS. 1*a–c*, the locking and unlocking is effectuated by moving the plunger 205 along a direction Y, forcing the resilient part 202 along direction X widening the gap 220 until the notch 206 catches a slanted edge 211 of a notch 210 in the resilient part 201. The notch 206 in the plunger also comprises a slanted edge 208 along which the resilient part 202 slides when retracting.

The member 204 with the attached plunger 205 is unlocked from the main body by a pulling force applied backwards along the direction Y. A backwards motion resulting from such a force will entail the slanted edge 211 of the notch 210 in the resilient part 202 sliding against the slanted edge 208 of the notch 206 and hence bring about a motion of the resilient part 202 towards the direction X, widening the gap 220. Further backward motion of the member 204 and plunger 205 will result in an unlocking of the plunger 205 from the lock and release unit 200. The pulling force needed to release the plunger 205 from the locked position depends of course on the sizes an physical characteristics of the parts involved. By also applying a force upon the resilient part 202 along the direction X the unlocking action may be facilitated. Such a force may be applied via the actuating part 212. In fact both the locking action and the unlocking action may be facilitated by way of applying a force upon the actuating part 212 along the direction X.

Figure 3:
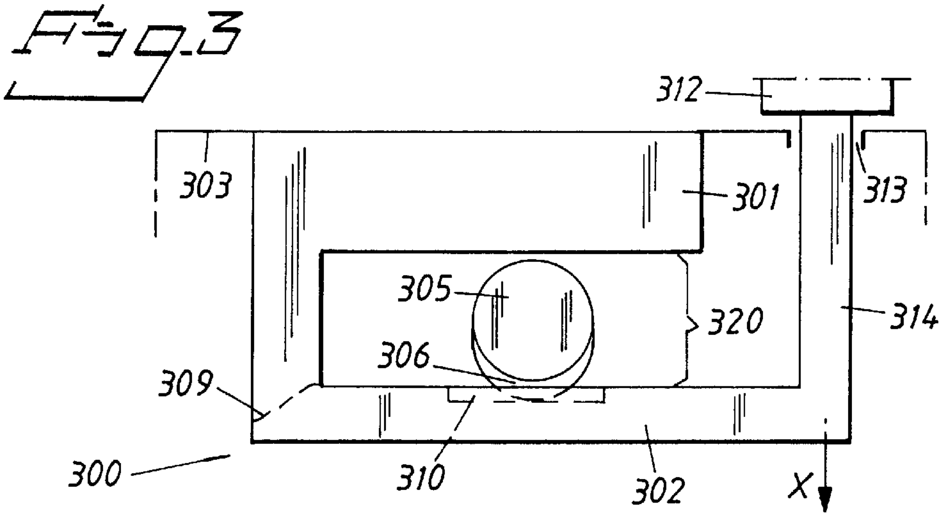
FIG. 3 illustrates a schematic side view of a third embodiment of a locking arrangement.

A further embodiment of a locking arrangement 300 is schematically disclosed in FIG. 3. As in previous examples, a fixed part 301 is attached to a main body 303 such as a housing of a telephone terminal. The fixed part 301 transfer to a resilient part 302 at a location indicated by a dashed line 309. The resilient part 302 is resilient along a direction X and is capable of being dislocated forwards and backwards along the direction X via an actuating part 312. The actuating part 312 forms part of an end of an actuating arm 314 which is elongated along the direction X and attached to the resilient part 302. The actuating arm 314 extends through a hole 313 in the main body 303 in more or less the same manner as in the previous example.

FIG. 3 also shows a plunger 305 having a notch 306 which is capable of being engaged into a locked position and disengaged from the locked position as shown in the examples above.

Figure 4:
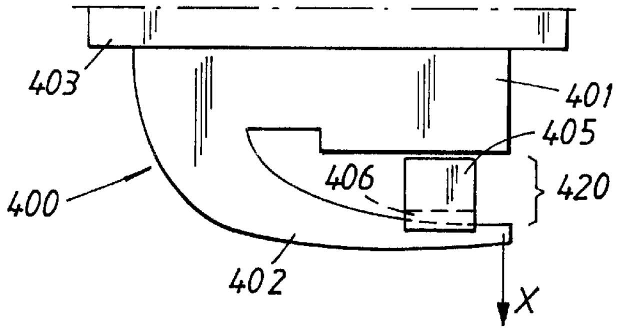
FIG. 4 illustrates a schematic side view of a fourth embodiment of a locking arrangement.

Yet another example of a locking arrangement 400 is schematically disclosed in FIG. 4. A fixed part 401 is attached to a main body 403. The fixed part 401 transfer to a resilient part 402 which is resilient along a direction X. In a gap 420 between the fixed part 401 and the resilient part 402 is a plunger 405 with a notch 406 located. This example is merely to illustrate yet a different shape of the parts, as e.g. the rectangular cross-section of the plunger 405 seen in the figure.

FIGS. 5, 6*a–c* and 7*a–b* show yet another illustration of a preferred embodiment of the present invention. A mobile telephone terminal 500 comprises a main body in the form of a housing 503 to which is attached a flip-lid 520. As is known in the art the terminal comprises means for communicating in a telecommunication network. In the housing 503 is located a display 524, keys 525 and a loudspeaker 523 and in the flip-lid 520 a microphone 522.

The flip-lid 520 is capable of being rotated from an open position to a closed position covering the keys 525 around an axis R by means of a hinge mechanism 521. Although not shown in FIG. 5, the hinge mechanism 521 may comprise means for spring-loading the lid 520 when in the closed position against the housing 503. The flip-lid 520 is in FIG. 5 shown in the open position.

In order to enable the lid to be engaged and disengaged to and from the closed and open positions respectively, the terminal 500 comprises a locking arrangement according to the present invention. A plunger unit 505 is attached to the flip-lid 520 and a lock and release unit (700 in FIG. 7*a*) is attached inside the housing 503. A hole 513 in the housing 503 allows access for the plunger 505 to the lock and release unit (700 in FIG. 7*a*).

Figure 5:
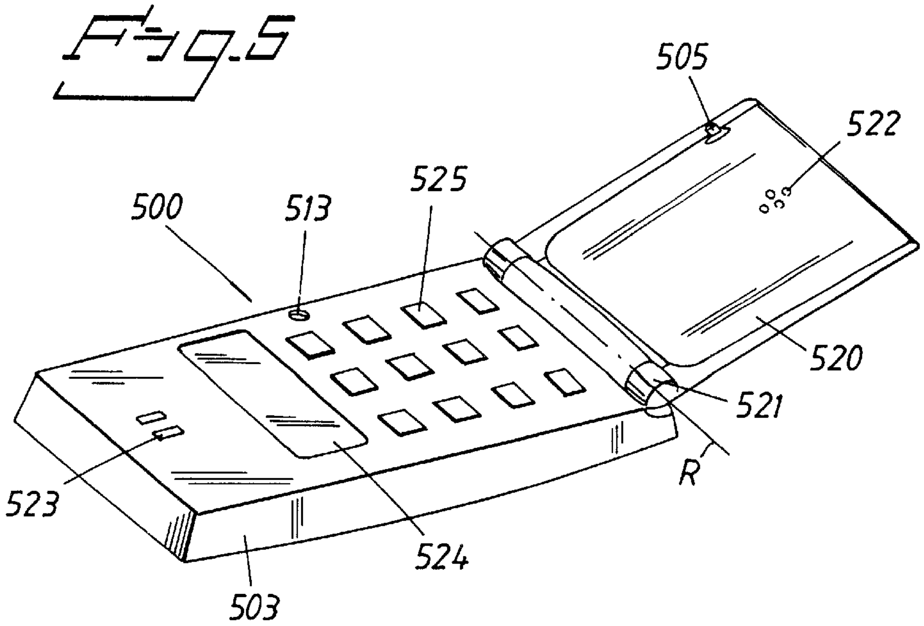
FIG. 5 illustrates a schematic perspective view of a portable telephone with a flip-lid.
Figure 6A:
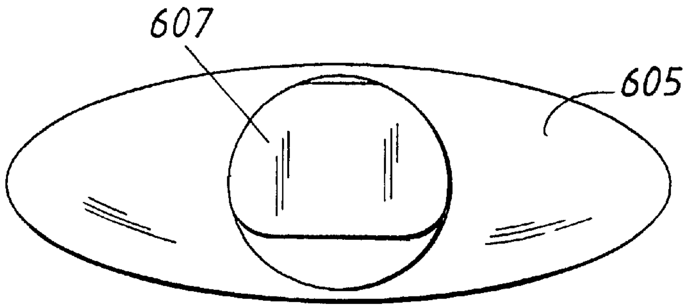
FIGS. 6*a–c* illustrate three schematic side views of a plunger unit.
Figure 6B:
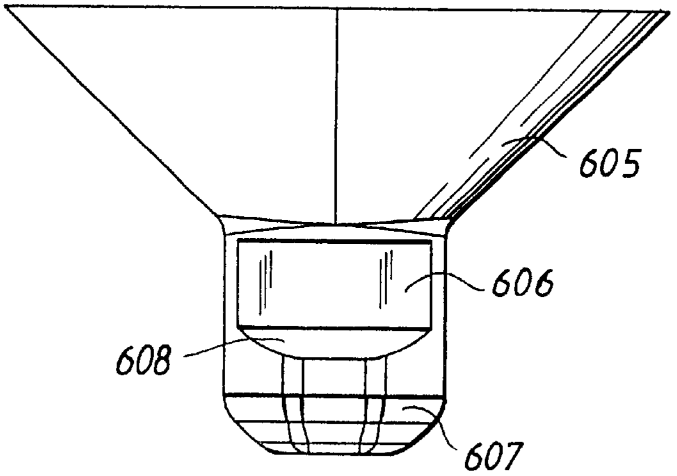
Figure 6C:
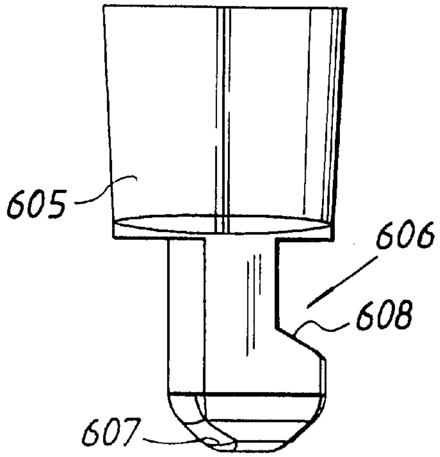

FIGS. 6*a–c* show three side views of a plunger 605 such as the plunger 505 shown attached to the flip-lid 520 in FIG. 5. The plunger has a tapered end 607 and a notch 606 with a slanted edge 608, generally of the same shape as the plungers 105,205 shown in previous examples. Although the plunger 605 is shown to be a separate part detached from any flip-lid etc, it is understood that the plunger 605 may be an integral part of the flip-lid (520 in FIG. 5).

Figure 7A:
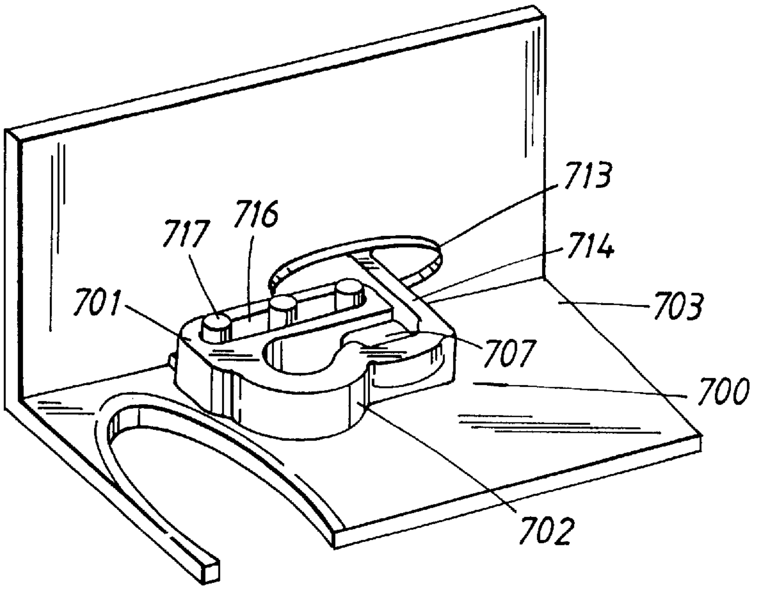
FIGS. 7*a–b* illustrate two schematic perspective views of a lock and release unit attached to a housing of a device.
Figure 7B:
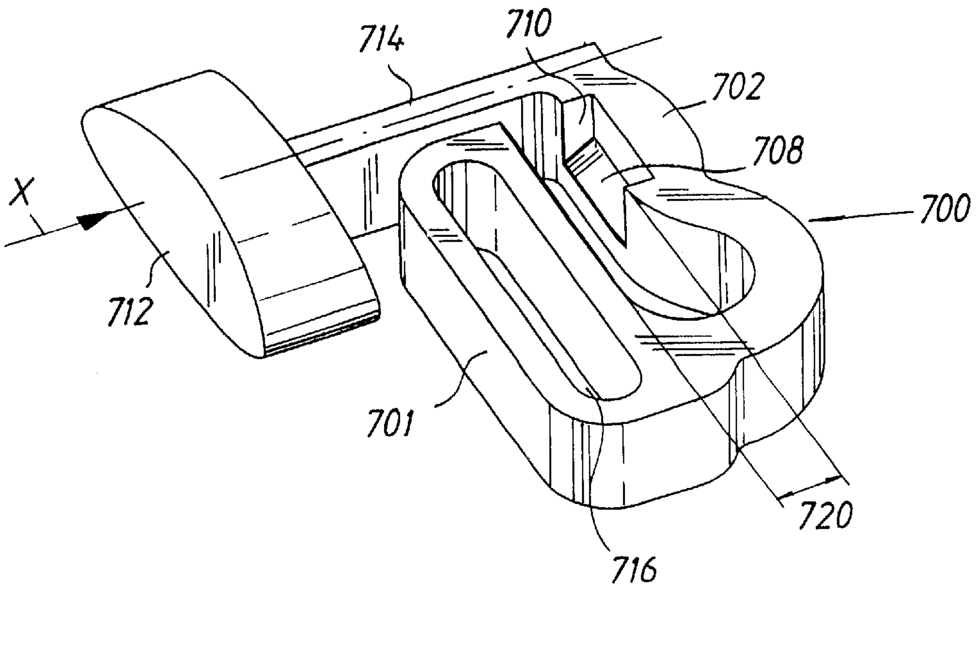

FIGS. 7*a* and 7*b* show in some detail a lock and release unit 700 which is attached to the inside of a housing 703, corresponding to the housing 503 in FIG. 5. A fixed part 701, a resilient part 702 and an actuating arm 714 with an actuating part 712. Similar to previous examples, the resilient part 702 has a direction of resilience X away from the fixed part 701 which enables a gap 720 between the two parts to become wider when a force is applied along the direction X on the actuating part 712. The fixed part 701 is attached to the inside of the housing 703 by means of knobs 717 protruding from the housing 703 and engaging the fixed part 701 via an opening 716.

A tip 707 of a plunger (505 in FIG. 5, 605 in FIGS. 6*a–c*) having a tapered end 707 is engaged in a notch 708 in the resilient part 702 in the same manner as disclosed in previous examples above. By applying a force along the direction X on the actuating part 712 protruding out from the housing 703 through a hole 713, the gap 720 widens and the plunger is detached from the engaged position.

The above examples above show implementations of the invention where a plunger is attached to a protruding member and a lock and release unit is attached to a main body of a device. However, other embodiments where a plunger is attached to a main body and a lock and release unit is attached to a protruding member are, needless to say, also feasible. Although preferred embodiments of the system and apparatus of the present invention have been illustrated in the accompanying Drawings and described in the foregoing detailed description, it will be understood that the invention is not limited to the embodiments disclosed, but is capable of numerous rearrangements, modifications and substitutions without departing from the spirit of the invention as set forth and defined by the following claims.

What is claimed is:

1. A locking system of a portable device, the device including a main body and a movable protruding member switchable between at least a first position and a second position with respect to the main body, said locking system comprising:

a plunger unit, the plunger unit attached to at least one of the main body and the protruding member;

a lock and release unit, the lock and release unit attached to at least one of the main body and the protruding member, the lock and release unit further includes a fixed part and a resilient part, where the resilient part has a direction of resilience away from the fixed part;

said plunger unit is switchable, along a direction of insertion and retraction, between a disengaged position and an engaged position between the fixed part and the resilient part of the lock and release unit; and said lock and release unit further includes an actuator for enabling actuation of the resilient part along the direction of resilience, wherein the direction of resilience is substantially perpendicular to the direction of insertion and retraction.

2. The locking system according to claim 1, wherein the actuator further includes an actuating part attached to the resilient part of the lock and release unit.

3. The locking system according to claim 1, wherein the plunger unit is attached to the main body of the device, and the lock and release unit is attached by the fixed part to the protruding member.

4. The locking system according to claim 1, wherein the plunger unit is attached to the protruding member, and the fixed part of the lock and release unit is attached to the main body of the device.

5. The locking system according to claim 1, wherein the actuator further includes an actuating arm elongated along the direction of resilience of the resilient part and attached to the resilient part for facilitating at least one of a locking action and an unlocking action by way of applying a force upon an actuating part along the direction of resilience.

6. The locking system according to claim 1, wherein the lock and release unit forms a single unit.

7. The locking system according to claim 1, wherein the lock and release unit is formed of at least two separate parts that are joined together.

8. The locking system according to claim 1, wherein the resilient part and the fixed part of the lock and release unit are elongated in shape and are joined together at one of their respective ends.

9. The locking system according to claim 1, wherein the plunger unit further includes a tapered end for enabling separation of the resilient part from the fixed part of the lock and release unit when the plunger unit is inserted along the direction of insertion and retraction into the engaged position.

10. The locking system according to claim 9, wherein the plunger unit further includes a notch for locking the plunger unit in the engaged position.

11. The locking system according to claim 10, wherein the notch further includes a slanted edge, wherein the direction of slant is in respect of the direction of insertion and retraction.

12. The locking system according to claim 11, wherein the lock and release unit further includes a notch for engaging the plunger notch in the engaged position.

13. The locking system according to claim 12, wherein the notch of the lock and release unit further includes a slanted edge, wherein the direction of slant is in respect of the direction of insertion and retraction.

14. The locking system according to claim 13, wherein the notch of the lock and release unit is located in the resilient part.

15. A portable communication device, comprising:

a main body;

a protruding member attached to the main body by a hinge unit, the protruding member is switchable between at least a first position and a second position with respect to the main body;

a lock and release unit attached to at least one of the main body and the protruding member, the lock and release unit further includes a fixed part and a resilient part, where the resilient part having at least one direction of resilience away from the fixed part;

a plunger unit attached to at least one of the main body and the protruding member, the plunger is switchable, along a direction of insertion and retraction, between a disengaged position and an engaged position between the fixed part and the resilient part of the lock and release unit; and said lock and release unit further includes an actuator for enabling actuation of the resilient part along the direction of resilience, wherein the direction of resilience is substantially perpendicular to the direction of insertion and retraction.

16. The portable communication device according to claim 15, wherein the plunger unit is attached to the main body of the portable communication device, and the lock and release unit is attached by the fixed part to the protruding member.

17. The portable communication device according to claim 15, wherein the plunger unit is attached to the protruding member, and the fixed part of the lock and release unit is attached to the main body of the portable communication device.

18. The portable communication device according to claim 17, wherein the lock and release unit is attached to an inside surface of the main body and is located by a hole in the main body, wherein the hole allows entry of the plunger when switching from the disengaged position to the engaged position.

19. The portable communication device according to claim 15, wherein the actuator forms an extension of the resilient part of the lock and release unit.

20. The portable communication device according to claim 15, wherein the actuator further includes an actuating arm elongated along the direction of resilience and attached to the resilient part for facilitating at least one of a locking action and an unlocking action.

21. The portable communication device according to claim 20, wherein the resilient part and the fixed part of the lock and release unit are elongated in shape and are joined together at one of their respective ends.

22. The portable communication device according to claim 21, wherein the plunger unit further includes a tapered end for enabling separation of the resilient part from the fixed part of the lock and release unit when the plunger unit is inserted along the direction of insertion and retraction into the engaged position.

23. The portable communication device according to claim 22, wherein the plunger unit further includes a notch for locking the plunger unit in the engaged position.

24. The portable communication device according to claim 23, wherein the notch further includes a slanted edge, wherein the direction of slant is in respect of the direction of insertion and retraction.

25. The portable communication device according to claim 24, wherein the lock and release unit further includes a notch for engaging the plunger notch in the engaged position.

26. The portable communication device according to claim 25, wherein the notch of the lock and release unit further includes a slanted edge, wherein the direction of slant is in respect of the direction of insertion and retraction.

27. The portable communication device according to claim 26, wherein the notch of the lock and release unit is located in the resilient part.

28. A mobile telephone terminal, comprising:

a housing including a lock and release unit adjacent to a surface of the housing, said lock and release unit further including:

a fixed part; and a resilient part connected to the fixed part, the resilient part having at least one direction of resilience away from the fixed part; and a flip-lid connected to the housing, the flip-lid is switchable between at least a closed position and an open position with respect to the housing, said flip-lid further including:

a plunger unit that is engaged between the fixed part and the resilient part of the lock and release unit when the flip-lid is in the closed position, and said plunger unit is disengaged from the lock and release unit when the flip-lid is in the open position.

29. The mobile telephone terminal according to claim 28, wherein the plunger unit further includes:

a tapered end for enabling separation during engagement of the resilient part from the fixed part of the lock and release unit; and a notch for locking the plunger unit while in the engaged position.

* * * * *